United States Patent [19]

Hettinger

[11] Patent Number: 5,538,624
[45] Date of Patent: Jul. 23, 1996

[54] PROCESS, APPARATUS AND COMPOSITIONS FOR RECYCLE OF CRACKING CATALYST ADDITIVES

[75] Inventor: William P. Hettinger, Deerfield Beach, Fla.

[73] Assignee: Ashland Inc., Ashland, Ky.

[21] Appl. No.: 326,982

[22] Filed: Oct. 21, 1994

[51] Int. Cl.⁶ .......................... C10G 11/04; B01J 21/20; B01J 23/90
[52] U.S. Cl. .................. 208/121; 208/124; 208/152; 502/5; 502/21
[58] Field of Search .................. 208/52 CT, 113, 208/121, 124, 152, 291 R, 253; 502/5, 21, 516, 521; 252/62.51

[56] References Cited

U.S. PATENT DOCUMENTS

| | | | |
|---|---|---|---|
| 1,390,688 | 9/1921 | Ellis . | |
| 1,576,690 | 3/1926 | Ullrich . | |
| 2,065,460 | 12/1936 | Johnson | 209/214 |
| 2,264,756 | 12/1941 | Johnston | 260/81 |
| 2,348,418 | 5/1944 | Roesch | 196/52 |
| 2,459,343 | 1/1949 | Schrivenur | 210/1.5 |
| 2,471,078 | 5/1949 | Ogorzaly | 196/52 |
| 2,604,207 | 7/1952 | Scott | 209/218 |
| 2,631,124 | 3/1953 | Ogorzaly | 196/52 |
| 2,635,749 | 4/1953 | Cropper | 209/127 |
| 2,723,997 | 11/1955 | Reynolds | 260/604 |
| 3,463,310 | 8/1969 | Ergun | 209/8 |
| 3,725,241 | 4/1973 | Chervinak | 208/8 |
| 3,901,795 | 8/1973 | Smith | 209/39 |
| 3,926,789 | 12/1975 | Shubert | 209/8 |
| 4,021,367 | 5/1977 | Gal | 252/411 |
| 4,029,495 | 6/1977 | Hirayama | 75/10 |
| 4,280,896 | 7/1981 | Bearden | 208/113 |
| 4,292,171 | 9/1981 | Mayer | 208/164 |
| 4,294,688 | 10/1981 | Mayer | 208/164 |
| 4,359,379 | 11/1982 | Ushio | 208/120 |
| 4,388,179 | 6/1983 | Lewis | 208/177 |
| 4,394,282 | 7/1983 | Seiver | 252/62.5 |
| 4,482,450 | 11/1984 | Ushio | 208/152 |
| 4,541,920 | 9/1985 | Seiver | 208/138 |
| 4,702,825 | 10/1987 | Selvaggi | 209/224 |
| 4,772,381 | 9/1988 | Julius | 209/12 |
| 5,171,424 | 12/1992 | Hettinger | 208/121 |
| 5,198,098 | 3/1993 | Hettinger | 208/85 |
| 5,328,594 | 7/1994 | Hettinger | 208/121 |

OTHER PUBLICATIONS

Magnetic Methods for the Treatment of Minerals by J. Svaboda, published by Elseiver Science Publishing Co., Inc., NY, NY, (ISBNO–44–42811–9, vol, 8).

*Primary Examiner*—E. Rollins Cross
*Assistant Examiner*—Bekir L. Yildirim
*Attorney, Agent, or Firm*—Richard C. Willson, Jr.

[57] ABSTRACT

An improved catalytic process for heavy hydrocarbon conversion (usually but not necessarily in the presence of nickel and vanadium in the feedstock and on the catalyst) to produce lighter and selective molecular weight fractions. This process is specifically targeted as a means of retaining specialty high-valued, preferably microspherical additives (SHVA) which assist in attaining preferred conversion products such as gasoline, especially the recent gasolines meeting compositional requirements of "Reformulated Fuel".

Selective magnetic retention of these high-cost specialty additives can be achieved by incorporating into them selective magnetic moieties, preferably manganese, the heavy rare earths and superparamagnetic iron. Selective retention is achieved by passing spent or regenerated catalyst containing small amounts of these SHVAs through a magnetic separator, and selectively recycling them back to the circulating catalyst.

27 Claims, No Drawings

PROCESS, APPARATUS AND COMPOSITIONS FOR RECYCLE OF CRACKING CATALYST ADDITIVES

Cross Reference to Related Applications

Cross references to related applications, U.S. patent application 08/073,834, filed Jun. 8, 1993 now U.S. 5,364,827 (docket number 6345CUS) and U.S. patent application Ser. No. 07/695,188, filed May 3, 1991 now U.S. 5,393,442 (docket number 6381AUS) relates to the general field of the present invention.

BACKGROUND OF THE INVENTION

I. Field of the Invention

This invention relates to catalysts and additives therefore generally classified in U.S. Patent Office, Class 55, subclass 3; Class 208, subclasses 52CT, 113, 119, 120, 121, 124, 137, 139, 140, 152, 251R, and 253; Class 209, subclasses 8, 38, 39, and 40; and Class 502, subclasses 5, 20, 21, 38, 515, 516, and 518.

II. Description of the Prior Art

U.S. Pat. No. 4,406,773 (1983) to W. P. Hettinger, et al. discloses magnetic separation of old catalyst from new by a high magnetic field gradient separator (HGMS) which produces a high magnetic field gradient to achieve selective separation.

Subsequent work has uncovered a preferred method of separation involving the use of a magnetic rare earth roller device (RERMS).

U.S. Pat. No. 5,147,527 to Hettinger covers the concept of using a magnetic rare earth roller device (RERMS) for magnetic separation.

U.S. Pat. No. 5,106,486 to Hettinger and Bensley discloses the presence of paramagnetic iron to enhance separation.

U.S. Pat. No. 5,230,869 to Hettinger covers the discovery of a highly superparamagnetic specie, which when present in aged equilibrium catalyst, further improves separation due to its very high magnetic susceptibility compared to normal paramagnetic iron.

U.S. Pat. No. 5,198,098 to Hettinger covers the use of manganese as a "magnetic hook" additive that not only facilitates selective removal of old catalyst, but also serves to reduce activity decline, and improves catalyst performance by reducing coke and hydrogen make and increasing gasoline yield selectivity.

U.S. Pat. No. 5,171,424 to Hettinger teaches the use of highly paramagnetic heavy rare earths as "magnetic hook" additives, and also serves to reduce activity decline and increase catalyst performance.

SUMMARY OF THE INVENTION

According to the invention, it is an improved catalytic process for heavy hydrocarbon conversion (usually but not necessarily in the presence of nickel and vanadium in the feedstock and on the catalyst) to produce lighter and selective molecular weight fractions. This process is specifically targeted as a means of retaining specialty high-valued, preferably microspherical additives (SHVA) which assist in attaining preferred conversion products such as gasoline, especially the recent gasolines meeting compositional requirements of "Reformulated Fuel".

Selective magnetic retention of these high-cost specialty additives can be achieved by incorporating into them selective magnetic enhancement agents, preferably manganese, the heavy rare earths and superparamagnetic iron. Selective retention is achieved by passing spent or regenerated catalyst containing small amounts of these SHVAs through a magnetic separator, and selectively recycling them back to the circulating catalyst.

I. General Statement of the Invention

The Clean Air Act of 1990, requires that special fuels called "reformulated fuels," be sold in a number of carbon monoxide "non-attainment areas" in the United States. It is difficult for petroleum refiners to produce these new reformulated fuels because they are limited in content of olefins and aromatics, requiring a low vapor reid pressure and low sulfur content, and must contain oxygenated fuels. These new requirements are changing the art of catalytic cracking and many new and important special high cost additive contributors to the cracking mechanism will be required. These can be described as "special high valued additives" (SHVA).

For example, refiners need to convert much more of their gas oil to isobutylene which can in turn be converted into MTBE (methyl tertiary butyl ether), an oxygen containing molecule.

The catalytic cracked gasoline must have as high an octane number as possible but still be low in olefins and aromatics content. An ingredient of gasoline which has a very low octane number is the normal paraffins. The octane number, for example, for normal heptane is zero and for normal octane is even below zero. It is apparent that if one selectively removes normal paraffins or only slightly branched paraffins, then the octane number of the remaining fuel will be higher.

As a result, there has been rapid exploitation of a new catalyst zeolite which has a very small pore in which catalytic cracking can occur. The best known is produced by Mobil Oil Company (see e.g., U.S. Pat. Nos. 3,702,886; 5,227,028; and British patent 1,574,523) and is called ZSM5. This crystalline zeolite has a small pore opening and allows only normal paraffins to enter its crystal to be cracked.

If ZSM5 is incorporated in the cracking catalyst, it will selectively crack low octane normal paraffins and will therefore, enhance the octane number of the final product. Ashland Oil, Inc. early anticipated the need for ZSM5 to be included in their patented RCC® process catalyst, where it was demonstrated that high boiling normal paraffins, which are difficult to crack catalytically, could also be cracked selectively by ZSM5 into gasoline. Ashland patents claim ZSM5 as an ingredient (U.S. Pat. No. 4,588,702 and U.S. Pat. No. 4,877,514). However, ZSM5 zeolite in itself is extremely costly (currently $50,000 to $80,000/ton). Therefore, ZSM5 must be diluted by incorporating it into a cracking catalyst mixture, preferably as a microspherical additive. This is preferably accomplished by combining or incorporating a small amount of ZSM5 in a separate silica gel and/or silica-alumina and/or clay gel composition, preferably a spray dried microsphere, which additive microsphere preferably does not contain the normal X and Y zeolites.

Separate materials containing various levels of ZSM5 are now being produced by catalyst manufacturers and each of these various products has been given a specific composition designation.

The ZSM5 is so expensive that the finished product, containing 1% to 20% ZSM5, may cost two or even five times as much per pound as a conventional cracking catalyst.

Because of this cost, several techniques have been utilized to enhance SHVA retention in the cracking unit. One technique is to improve the attrition resistance of the ZSM5-containing catalyst particle, so it does not wear down as quickly as normal cracking catalyst and will tend to maintain its particle size and to stay in the unit longer than normal commercial catalyst.

A second technique makes the additive microspheres larger so that this selectively coarser SHVA material is preferentially retained by one or more means in the cracking unit. However, by using coarse particles, the SHVA effectiveness is reduced.

Neither of these approaches addresses the problem if even small amounts of catalyst are removed daily to make room for fresh catalyst makeup, which is generally the case. A portion of the fresh catalyst added on any given day is inadvertently included in the catalyst withdrawn from the cracking unit the following day and in each portion removed each day afterward, a costly loss of active catalyst. What is needed is a means for selectively retaining the expensive additives (SHVA), such as diluted ZSM5, when conventional catalyst is discarded.

Other costly catalyst microspherical specialty additives, such as those added to trap or immobilize vanadia or to provide an acidic matrix catalyst for selectively cracking large paraffin materials in heavy crude fractions (too large to enter an X or Y zeolite crystal) are also good examples of particulate specialty additives which need to be selectively retained.

Another microspherical additive containing a small amount of highly expensive platinum is also used to speed up coke burning and conversion of CO to $CO_2$ in the regenerator. This expensive microspherical additive needs to be selectively retained.

Another microspherical additive, typified by DeSOX now selling for about $13,500/ton, is also being utilized to combat two other problems encountered in processing or catalytically cracking crude oils containing higher amounts of sulfur. For these crudes, it is desirable that much sulfur be removed from produced gasoline, to meet rapidly falling sulfur specifications in the final product. It is also desired to sharply reduce the concentration of sulfur dioxide and sulfur trioxide in the effluent regeneration gas to achieve lower levels of effluent $SO_2$ and $SO_3$. Also, special additive-containing catalysts are being sought which can better remove sulfur directly from the gasoline.

These catalyst microspherical additives quickly convert $SO_2$ to $SO_3$ in the regenerator, then react with it to form a sulfate compound which is retained and then carried into the reactor.

A second catalyst characteristic, built into this or related additives, speeds up catalytic hydroconversion of sulfate back to $SO_2$ to free sulfur and/or hydrogen sulfide, which is then separated as a by-product from the reactor product effluent, and sent to a sulfur recovery unit for sale as sulfur.

Future microspherical additives are also anticipated; one to retain the oxides of nitrogen in a manner similar to the above, and another to more selectively produce isobutylene for production of methyl and ethyl tertiary butyl ether.

Still another type of SHVA is designed to selectively trap and immobilize vanadium.

Another approach described in U.S. Pat. No. 4,835,128 to Child, et al. (Mobil), brings spent catalyst particles containing metal deposits into a regenerator, where they are mixed with particles containing passivating materials which trap the metal deposits, presumably vanadium, while the spent catalyst particles and the passivating particles are in the regenerator. Subsequently, the passivating materials, containing trapped metal deposits extracted from metal-contaminated catalyst, are separated from the contaminated catalyst and the lowered-metal-contaminated catalyst is returned to the reactor, while a portion of the passivating particles is disposed of, and the remainder is returned to the regenerator for subsequent repeat of this operation. Even here, separation of highly loaded passivating particles from fresh passivating particles is still a problem.

Particles are separated by means of particle size and/or particle density. This Child patent also discloses use of a particle containing a magnetic material such as iron, and separating passivating particles from regenerated catalyst. Only regenerated catalyst is returned to the reactor. No claims recite use of a magnetic means of separation.

In Child's description of a magnetic substance, all catalyst and passivating particles are fully separated for each recycle of catalyst before returning to the reactor. Therefore, all catalyst must be magnetically processed and to achieve magnetic separation all catalyst and passivating particles must all be lowered to temperatures below about 150°–200° C. (302°–392° F.) after each regeneration cycle to facilitate separation if magnetic separation were utilized. This may not be a practical and economical utilization of magnetic separation. Further, Child's passivating particles never pass through the reactor while utilizing the high priced catalyst additives of his invention.

For example, by way of comparison, if all catalyst in a 400-ton catalyst inventory catalytic cracker (FCC or RCC®) is circulated every 20 minutes, then Child requires 1,200 tons of catalyst to be cooled from 1100° to 1200° F. to 300°–400° F., magnetically processed, reheated, and returned to the reactor each cycle. This amounts to 28,800 tons of catalyst to be processed, cooled, and reheated each day. According to our invention, where 30 to 40 tons of catalyst may be added each day, 30 to 40 tons of disposable catalyst are cooled, processed by magnetic separation to remove high cost additives for return to the process. Preferably a second high-metals portion of catalyst can be separated out by a second magnetic separation for disposal or recovery. The magnitude of the difference in processing is striking (28,800 tons per day for the Child's patent compared with only 40 tons or even 80 tons per day for our invention).

The present invention, as against the Child's invention, adds a highly selective additive with high magnetic properties to a high performance particulate, preferably microspherical, additive, so as to achieve the goals mentioned, and to facilitate recycle of the specialty additives to enable them to perform at high catalytic level with better retention and less loss.

Only a small slip stream of circulating catalyst, 0.1–5% of inventory need be withdrawn for purposes of making room for fresh catalyst while selectively collecting and recycling expensive additives and disposing of remaining discharged catalyst. Here cooling of only a small portion of the circulating catalyst is required.

Therefore, an economical and simple method that would selectively retain these highly expensive microspherical catalyst additives would be very much desired and could produce great economic savings, especially where reformulated fuel is required.

According to the invention, retention of these expensive catalyst particles is achieved by adding an additional highly magnetic ingredient to these special particles (e.g., microspheres) so as to selectively retain them for normal catalyst operations, while also still separating them from Ni, V and Fe contaminated conventional catalyst particles.

Considering all the possible magnetic elements ("magnetic moieties") that might be utilized to further enhance magnetic separation and selectively achieve recycle of expensive additives by incorporating them in the particle, as a "magnetic hook", manganese is surprisingly by far the most preferred magnetic ingredient for reasons set forth below. Superior, though less preferred are the heavy rare earths and/or superparamagnetic iron, as disclosed in our recently issued patents (U.S. Pat. Nos. 5,230,869; 5,198,098; 5,190,635; 5,171,424; 5,147,527). Contrary to those patents, however, which depend on continuous addition of a magnetic hook additive to circulating catalyst, so as to relate to catalyst age and loss of activity, this invention embodies initial high loading of a magnetic specie on the microspherical additive so as to facilitate continuous magnetic recapture and recycling of these expensive microspherical additives.

Therefore, the invention comprises the use of manganese and/or the heavy rare earths and/or superparamagnetic iron added to expensive microspherical additive particles in the range of 0.05–20 wt.%, more preferably 0.10–10% additive by weight. The magnetic hooks can be added to the specialty particles as organic, inorganic and/or colloidal chemicals.

The oxides of manganese are especially ideal. Other examples of manganese compounds can include but are not limited to, manganese, acetate, MMT (monocyclopentadiene manganese tricarbonyl) or manganese sulfate or manganese dichloride. Other higher valence compounds of manganese may also be employed.

These "enhanced" magnetic-hook-loaded, high-valued (preferably microspherical) additives (MHSHVA) being added continuously and present in daily disposed catalyst, are subjected daily to a magnetic separator, thereby selectively recovering the more highly magnetic and expensive microspherical additive catalyst particles and returning them to the conversion unit, while subsequently disposing of the deactivated and/or metal-loaded conventional catalyst. Low-metal contaminated conventional catalyst may also be returned or recycled by a second magnetic separation of the disposable catalyst.

The invention is especially useful in selectively retaining specialty microspheres while processing cracking gas oils where there is very little contaminant metal present in the feedstock. In other words, it is especially preferred for, but not limited to, the cracking of feeds that contain little or no iron, nickel, vanadium, or other metals.

Where a high amount of metal is naturally accumulating on the catalyst, a two-step separation can be utilized in which all magnetic particles, both old metal contaminated cracking catalyst and additive-containing microspherical catalysts (MHSHVA) are collectively separated. Then this separated magnetic material preferably can be further subjected to a second magnetic separation in which the very highly magnetic particles loaded with manganese, rare earth or superparamagnetic iron are further separated from those catalyst particles containing only nickel, vanadium, and iron. The highly magnetic loaded expensive particle, even with some metals thereon, are then recycled to the conversion unit and the old metal-contaminated and deactivated catalyst is disposed of. Contaminated catalyst can, of course, also contain one or more magnetic hook additives being added continuously for that purpose of facilitating separation of old catalyst. This two-step magnetic separation can be alternatively replaced with a single magnetic separator separating into three portions in one pass: MHSHVA, high-metal conventional catalyst and low-metal conventional catalyst.

As the requirements and tasks for which catalytic cracking (the work-horse of the refinery), is being called upon to accomplish continue to increase in complexity, demand will strengthen even more, and for a greater variety, of these expensive additives.

In spite of these new additive introductions, the major burden of the catalytic cracker and the work-horse catalyst is still to reduce molecular weight and produce high octane components despite increases in deactivating conditions and adverse metals. This demands higher conventional catalyst replacement rate, aggravating the problem of retaining these expensive microspherical additives.

Preferably, rather than passing all catalyst through the magnetic separator, a slip stream of equilibrium catalyst to be discharged to make way for fresh catalyst addition is passed through the magnetic separation unit and high-cost additive selectively returned to the unit, while remaining catalyst is disposed of. As mentioned above, the process can also be used in conjunction with the magnetic hooks of U.S. Pat. No. 5,328,594 to Hettinger. II. Utility of the Invention The invention is useful for petroleum refining processes, particularly useful for catalytic cracking processes, generally classified in U.S. Class 208.

DESCRIPTION OF THE PREFERRED EMBODIMENTS

Table A summarizes some preferred process parameters.

TABLE A

| | | PROCESS | | |
|---|---|---|---|---|
| Parameter | Units | Preferred | More Preferred | Most Preferred |
| Percent specialty catalyst | wt. % | 0.1–90 | 1–50 | 5–30 |
| Mn on specialty additive cat. | wt. % | 0.1–75 | 0.1–20 | 0.1–10 |
| Recovery in first mag. cut | wt. % | 25–100 | 30–75 | 35–60 |
| MnO in first magnetic cut | wt. % | 60–99 | 70–95 | 80–94 |
| Mag. Susceptibility of catalyst | $10^{-6}$ emu/g | 0.05–50 | 1–40 | 2–30 |

EXAMPLE 1

(Separation of Expensive Additive from Equilibrium Catalyst in Several Magnetic Cuts)

A special microspherical paraffin cracking catalyst containing 8% of Mobil Oil zeolite ZSM5 and selling for $4,000/ton, is impregnated with a solution of manganese acetate hydrate as follows: 150 grams of catalyst is dispersed in 200 ml of water and combined with 68 grams of manganese acetate 4•$H_2O$ dissolved in 100 ml of hot $H_2O$, and which solution is then brought near to a boil at about 95° C. (203° F.) until the manganese solution is clear, before mixing with catalyst. The catalyst slurry and the hot manganese solution are combined and heating and stirring continued until said slurry is fairly well dehydrated. The dehydrated material is then transferred to an oven for further drying, heated overnight at 200° C. (392° F.), after which it is calcined at 650° C. (1200 ° F.) for five hours.

Magnetic susceptibility is measured on a Johnson-Matthey Balance after cooling to room temperature. Magnetic susceptibility is 26×10–6 emu/gm, compared with 0.8×10–6 emu/gm prior to impregnation. Chemical analysis of the finished additive catalyst by x-ray fluorescence shows it contains 95,000 ppm Mn or 122,000 ppm MnO.

135 gm of a metal-containing cracking catalyst from commercial operation is mixed with 15 grams of the above manganese treated ZSM5 containing microspheres and subjected to magnetic separation in a belt rare earth roller apparatus similar to that of U.S. Pat. No. 5,230,869 and U.S. Pat. No. 5,147,527 to Hettinger.

The composition of the manganese containing additive is set forth in Table 1.

TABLE 1

| | \multicolumn{8}{c}{Chemical Composition of Manganese Incorporated ZSM5-Containing Additive} | | | | | | | |
|---|---|---|---|---|---|---|---|---|
| | Na2O | MgO | Al2O3 | SiO2 | P2O5 | TlO2 | MnO | Fe2O3 |
| Wt. % | 0.24 | <0.05 | 30.8 | 47.7 | 6.39 | 1.9 | 12.2 | 1.06 |

By analysis, the composition of the additive, commercial catalyst combination feed to the magnetic separator is as given in Table 2.

TABLE 2

| | \multicolumn{8}{c}{10% Manganese Containing Additive in Commercial Catalyst} | | | | | | | |
|---|---|---|---|---|---|---|---|---|
| | Na2O | MgO | Al2O3 | SiO2 | P2O5 | TlO2 | MnO | Fe2O3 |
| Wt. % | 0.60 | <0.05 | 27.7 | 66.3 | 0.98 | 0.87 | 1.07 | 0.50 |

It also contains 542 ppm V and 268 ppm Ni.

The mixture described above is subjected to magnetic separation into seven cuts, starting with the most magnetic fraction and ending with the least magnetic fraction. The weight percent of each cut together with the chemical analysis of each cut is shown in Table 3.

TABLE 3

| | \multicolumn{10}{c}{Chemical Composition of Magnetic Cuts} | | | | | | | | | |
|---|---|---|---|---|---|---|---|---|---|---|
| | Wt. % | Al2O3 | SiO2 | P2O5 | TlO2 | MnO | Fe2O3 | V | Ni | Fe |
| 1 | 16.1 | 29.6 | 59.0 | 3.29 | 1.34 | 5.20 | 0.79 | 455 | 249 | 5450 |
| 2 | 14.5 | 28.4 | 63.8 | 1.67 | 1.01 | 1.96 | 0.54 | 563 | 291 | 3926 |
| 3 | 14.9 | 27.6 | 66.9 | 0.60 | 0.80 | 0.36 | 0.43 | 588 | 291 | 2997 |
| 4 | 14.7 | 27.4 | 67.9 | 0.37 | 0.75 | 0.08 | 0.45 | 593 | 307 | 3105 |
| 5 | 13.9 | 27.2 | 68.0 | 0.33 | 0.72 | 0.04 | 0.46 | 570 | 294 | 3174 |
| 6 | 17.6 | 27.0 | 68.4 | 0.32 | 0.70 | 0.02 | 0.39 | 538 | 239 | 2691 |
| 7 | 8.1 | 26.8 | 69.9 | 0.33 | 0.69 | 0.01 | 0.41 | 488 | 209 | 2829 |

Cut No. being: 1—most magnetic to 7—least magnetic

As can be seen by study of Table 3, magnetic manganese, which is present on the ZSM5 additive and a second marker, P2O5, are both concentrated in the most magnetic cut, i.e., Number 1.

Table 4 uses both manganese dioxide and phosphorous pentoxide as markers for the microspherical ZSM5 containing additive, and shows the percent of each recovered in each magnetic cut.

TABLE 4

| | \multicolumn{5}{c}{Recovery of Special ZSM5 Containing Additive} | | | | |
|---|---|---|---|---|---|
| Cut | Wt. % | Total Wt. % Mno | Recovered % | Total Wt. % P2O5 | Recovered % |
| 1 | 16.1 | 0.83 | 77 | 0.53 | 54 |
| 2 | 14.5 | 0.28 | 16 | 0.24 | 25 |
| 3 | 14.9 | 0.05 | 4 | 0.09 | 10 |
| 4 | 14.7 | 0.01 | 1 | 0.04 | 4 |
| 5 | 13.9 | <0.01 | — | — | — |
| 6 | 17.6 | <0.01 | — | — | — |
| 7 | 8.1 | <0.01 | — | — | — |

Table 4 shows that 77% of all of the expensive ZSM5 containing microsphere additive is recovered in the first 16.1 wt.% of the mixture, and 93% in the first 30.6 wt.% of cuts 1 and 2, demonstrating the effectiveness of the method in enabling recovery of expensive additives for recycle.

Although P2O5 is somewhat volatile after calcination of the particles at 648.88° C. (1200° F.), still 79% of P2O5 is recovered in the first 30.6% of the mixture, and essentially all in the first 60%, a separation more than sufficient for economic recycling.

These results demonstrate how effective the magnetic hook enhancement additive and process of the invention can be in capturing and recycling selectively, expensive catalytic additives.

EXAMPLE 2

(Separation of Expensive Additive from Equilibrium Catalyst in One Magnetic Cut)

The mixture described in Example 1 is subjected to magnetic separation on the same rare earth roller. In this case, only two cuts are made: i.e., a magnetic cut and a non-magnetic cut. The magnetic portion of 19.7% is considered an attractive range for commercial utilization.

Table 5 shows an analysis of the 80.3 wt.% non-magnetic fraction and the 19.7 wt.% magnetic cut.

TABLE 5

|  | Wt. % | Al2O3 | SiO2 | P2O5 | TiO2 | MnO | Fe2O3 |
|---|---|---|---|---|---|---|---|
| Non-Magnetic | 80.3 | 27.4 | 66.4 | 0.78 | 0.70 | 0.69 | 0.43 |
| Magnetic | 19.7 | 28.9 | 63.7 | 2.14 | 1.13 | 3.46 | 0.74 |

|  | PPM | Fe | V | CR | Ni | Zn |
|---|---|---|---|---|---|---|
| Non-Magnetic | 80.3 | 2967 | 544 | 93 | 268 | 31 |
| Magnetic | 19.7 | 5106 | 525 | 181 | 292 | 45 |

Review of the analyses shows that 56% of the manganese-labeled ZSM5 loaded catalyst, has been collected in only 19.7 wt.% of catalyst, for a concentration factor of 57 wt.%/19.7 wt.% =2.9 times, showing how effective the invention can be for keeping valuable catalyst additives HVSA in the operating catalyst mixture by separation and recycle to the unit.

The additive catalyst impregnated with manganese has a magnetic susceptibility of $26.0 \times 10^{-6}$ emu/gm and after blending with equilibrium FCC catalyst (RPSB) with a magnetic susceptibility of $2.6 \times 10^{-6}$ emu/gm has a final magnetic susceptibility of $5.5 \times 10^{-6}$ emu/gm.

EXAMPLE 3

(Incorporation of One or More Magnetic Enhancement Additives to a Selective Additive for Improved Separation with a Single Magnetic Cut)

150 grams of catalyst taken from a carbometallic cracking unit (RCC® Unit) and, having a magnetic susceptibility of $32.4 \times 10^{-6}$ emu/gm, is slurried in 200 ml of water, and combined with 68 grams of manganese acetate•4 H$_2$O dissolved at high temperature (about 95° C.) in 100 ml of water and the combination is brought to a final temperature of about 100° C. (212° F.). Following this step, the mixture is continuously stirred and slowly brought to dryness. This sample is dried overnight in an oven at 120° C. (248° F.), then is dried overnight at 200° C. (392° F.) and then transferred to a calciner at 648.88° C. (1200° F.) for five hours. It has a magnetic susceptibility of $45.7 \times 10^{-6}$ emu/gm as measured by a magnetic susceptibility balance manufactured by John Matthey, showing an increase of $13.3 \times 10^{-6}$ emu/gm for an addition of 10 wt.% MnO.

The composition of this preparation is as follows:

TABLE 6

| Wt. % | | | | | | | | |
|---|---|---|---|---|---|---|---|---|
| Na2O | MgO | Al2O3 | SiO2 | P2O5 | CuO | TiO2 | MnO | Fe2O3 |
| 0.66 | 1.23 | 37.5 | 41.1 | 0.20 | 0.55 | 1.58 | 10.3 | 1.28 |

| PPM | | | | | | | | | |
|---|---|---|---|---|---|---|---|---|---|
| Fe | V | Cr | Co | Ni | Cu | Zn | Sn | Pb | Sr |
| 32 | 3718 | 639 | 52 | 1865 | 78 | 767 | 123 | 171 | 105 |

15 grams of this preparation is combined with 135 grams of equilibrium catalyst from a commercial catalytic cracking unit with a composition as shown in Table 7.

TABLE 7

|  | Al2O3 | SiO2 | TiO2 | Fe2O3 | MnO |
|---|---|---|---|---|---|
| Wt. % | 42.6 | 36.9 | 2.0 | 0.55 | 0.0 |

|  | Fe | V | Cr | Co | Ni | Zn | Pb |
|---|---|---|---|---|---|---|---|
| PPM | 37.95 | 772 | 41 | 41 | 463 | 122 | 19 |

This mixture is then subjected to magnetic separation, first in a split of two fractions, namely a 20% magnetic cut and an 80% non-magnetic portion. Table 8 shows the composition of the two portions after magnetic separation. For brevity, only the concentration of the more important metals are set forth.

TABLE 8

|  | Wt. | Al2O3 | SiO2 | MnO | Fe2O3 | Ni | V |
|---|---|---|---|---|---|---|---|
| Magnetic | 20 | 40.7 | 40.1 | 4.92 | 0.92 | 1085 | 2164 |
| Non-magnetic | 80 | 42.5 | 36.9 | 0.05 | 0.55 | 463 | 772 |

In this case, manganese, added to a catalyst which also contained superparamagnetic iron metal, is able to selectively enhance removal of this specie from regular catalyst. While it has not yet been fully demonstrated all ways to form superparamagnetic iron synthetically, this example shows that a high cost additive, loaded with superparamagnetic iron can also be selectively isolated and recycled to the conversion unit. Manganese was utilized as a marker to demonstrate again a selective separation. In this case, there is 1.03 wt.% MnO in the feed mixture to the magnetic separator and the 20 wt.% magnetic cut with a 4.92 wt.% MnO, represents 97% of all MnO added. This result demonstrates that a combination of superparamagnetic iron and manganese according to the invention can be equally or even more effective in isolating and facilitating recycle of high cost special microspherical catalysts and microspherical catalyst additives.

EXAMPLE 4

(Multi-Stage Separation of Magnetic Enhanced Additive and High Metal Deactivated Catalyst Fraction)

The same mixture as described in Example 3 is subjected to many more strenuous magnetic separations with results as shown in Table 9, in order to determine how sharp a separation can be achieved, and the profile of metal distribution as it relates to nickel, vanadium, and iron removal for the included equilibrium catalyst.

TABLE 9

| Cut | Wt. % | Al2O3 | SiO2 | MnO | Fe2O3 | V ppm | Ni |
|---|---|---|---|---|---|---|---|
| 1 | 12.9 | 37.0 | 37.3 | 5.65 | 1.05 | 2344 | 1197 |
| 2 | 13.6 | 43.7 | 39.2 | 0.46 | 0.74 | 942 | 602 |
| 3 | 11.8 | 43.7 | 38.6 | 0.06 | 0.65 | 827 | 525 |
| 4 | 11.6 | 44.4 | 38.8 | 0.02 | 0.59 | 794 | 501 |
| 5 | 11.4 | 43.7 | 38.3 | <0.01 | 0.59 | 769 | 489 |
| 6 | 14.0 | 44.7 | 39.1 | <0.01 | 0.60 | 812 | 505 |
| 7 | 24.8 | 44.5 | 40.1 | <0.01 | 0.62 | 752 | 449 |

Cut No. being: 1—most magnetic to 7—least magnetic

Table 10 tabulates MnO recovery versus the various cuts.

TABLE 10

| Cut | % of all MnO |
|---|---|
| 1 | 91 |
| 2 | 8 |
| 3 | 1 |
| 4–7 | 0 |

These results show in more detail that, within the first 12.9 wt.% of the mixture, 91 wt.% of the special microspherical additive in this case is retained for recycle.

EXAMPLE 5

(Magnetic Separation of An Expensive Additive From a High Metal Deactivated Catalyst)

This example demonstrates how magnetic enhancement separation can be used in a situation where it is desirable to utilize specialty high-priced microspherical additives such as: n-paraffin cracking catalysts; high acidic matrix cracking catalysts; sulfur retention catalysts; platinum oxidizing promotion catalysts; and vanadia traps such as, e.g., strontium or barium titanate. It also demonstrates how the magnetic hook concept, as covered in our U.S. Pat. Nos. 5,198,098; 5,230,869; 5,190,635; 5,171,424; 5,147,527; and 5,106,486 can be used in conjunction with this magnetic enhancement process to increase the retention of highly valuable additives while also increasing the ability of a magnetic separator to selectively remove the high-metals-contaminated catalysts when using the magnetic enhancement processing of the invention.

It should be carefully noted that this high "magnetic enhancement" invention covers incorporating a "magnetic-hook" enhancement agent into a finished high-priced additive as a manufacturing step prior to introduction to a commercial unit, as distinguished from the continuous addition of a magnetic hook additive to the circulating catalyst as covered in earlier listed patents.

135 grams of a residual catalyst commercial from Ashland's RCC® process, containing 2,000 ppm of nickel, 9,000 ppm of iron, and 5,000 ppm of vanadium is blended with 15 grams of manganese loaded ZSM5 microspherical additive and prepared as described in Example 1. This sample is then subjected to a rare earth roller magnetic separator as described in Example 1, with the results shown in Table 11.

TABLE 11

| Cut | Wt. % | Magnetic Susceptibility Xg × 10-6 emu/gm | PPM Ni | Fe | V | Mn |
|---|---|---|---|---|---|---|
| 1 | 15.8 | 92.3 | 2200 | 12,400 | 5000 | 6000 |
| 2 | 17.4 | 60.0 | 2100 | 9800 | 5100 | 8100 |
| 3 | 18.0 | 51.5 | 2000 | 8900 | 4800 | 12,400 |
| 4 | 15.4 | 40.9 | 1700 | 7900 | 4500 | 16,400 |
| 5 | 13.1 | 37.4 | 1600 | 7700 | 4400 | 15,600 |
| 6 | 20.5 | 24.5 | 1100 | 6400 | 3900 | 5900 |
| Feed | | 47.7 | 2000 | 8900 | 3900 | 11,400 |

The data shown in this table demonstrates that, even here, magnetic enhancement can be used to retain high-priced additives, even when a much higher metal loaded, high magnetic material is processed. Table 12 shows the distribution of manganese versus the various cuts.

TABLE 12

| Yield Wt. % | Cut No. | Mn Yield PPM | % of Mn |
|---|---|---|---|
| 15.8 | 1 | 6000 | 9.1 |
| 17.4 | 2 | 8100 | 13.6 |
| 18.0 | 3 | 12,400 | 21.5 |
| 15.4 | 4 | 16,400 | 24.4 |
| 13.1 | 5 | 15,600 | 19.7 |
| 20.5 | 6 | 5900 | 11.7 |
| Feed | | 11,400 | 100.0 |

In this operation, 50 tons of catalyst is added daily to 400 tons of inventory, requiring removal of 50 tons of circulating catalyst or 12.5 wt.%. These data demonstrate that 15.8 wt.% of high-metal-containing catalyst, 2200 ppm of nickel., 124,000 of iron and 5000 ppm of vanadium (representing the highest metal level), can be removed and disposed of, and is to be compared with 1100 ppm of nickel, 6400 ppm of iron, and 3900 ppm vanadium in the lowest 20.5 wt.% shown in Table 12, while only 9.1 wt.% of special additives is lost. This is as compared to a loss of 12.5 wt.% if all circulating catalyst is indiscriminately removed, as is done in the present situation. If the second 17.4 wt.% cut is also removed, 33.2% of heavy metal is removed, while still only 21.7% special additive is removed. To enhance separation by taking or making a second magnetic pass of this 33.2 wt.% cut (cuts 1 and 2), 47.8wt.% can be discarded with only a loss of 9.1% of the special additive, if the processing of the invention is utilized to reclaim expensive additive as practiced in the presence of a cheap operating catalyst.

This example demonstrates the versatility of the magnetic enhancement separation process of the invention.

EXAMPLE 6

(Magnetic Separation For Commercial Catalyst Consisting of Both Very High Activity Catalyst and Inert Diluent Other Applications of the Magnetic Hook or Magnetic Enhancement Process)

The invention may also be used in other ways to recover specific expensive catalytic particles from a mixture of low cost, or even inactive particles; e.g., in one commercial manufacturing process, highly activated catalyst particles are blended with inactive particles to achieve a desired catalyst activity. However, because of the relatively low activity of these particles, this is generally not considered a preferred technique for manufacturing catalyst material because any thermal cracking of molecules resulting from conversion on a hot inactive particle results in non-selective thermal cracking, which tends to produce less desirable low molecular weight gases such as ethylene rather than high octane C5 to C8 molecules. The selective retention of the invention can take advantage of the high activity of the activated portion by incorporating a magnetic enhancement substance, such as manganese, the heavy rare earths, and/or superparamagnetic iron into the activated portion. Alternatively, the manufacturer and/or the purchaser can impregnate the mixed active and inactive blend product with magnetic enhancement agent. Because the inactive portion of the catalyst has a much lower affinity for the additive, it will have much lower magnetic susceptibility and thus even discarded catalyst can be subjected to magnetic separation so as to selectively dispose of low or inactive catalyst while retaining the high activity portion. Here, in operation, magnetic separation and recycle of the active portion and discharge of the inactive diluent, greatly reduces catalyst cost and enhances profit of operation due to selectivity enhancement.

By "selectivity enhancement," is meant the increase in high valued gasoline and middle distillate yield, relative to production of hydrogen, coke, and light gases, per unit of conversion of gas oil or reduced crude; where "conversion" is defined as 100% minus the percent of oil remaining which boils above 221.11° C. (430° F.). Obviously, a very small increase in high-valued gasoline (C5 plus hydrocarbons) has a major impact on the profit of the refinery.

In addition to enhancement of selective retention of highly valuable catalyst particles, our evidence shows that selectivity is further enhanced by incorporation of manganese in high cost catalysts. For example, in reduced crude processing, wherein a much greater catalyst deactivation environment exists, such as higher regeneration temperature, greater moisture content in the regenerator, and high metals in the feed, it is customary to add both cheap equilibrium catalyst, which can be purchased on the open market as a commodity, and highly expensive selective new catalyst to maintain conversion, in order 1o keep operating costs at a minimum. In this case, manganese, the heavy rare earths, and/or superparamagnetic iron can be incorporated into the expensive catalyst, so as to maximize retention of the costly catalyst by magnetic separation, while discarding the less valuable cheap equilibrium catalyst.

As a side benefit, it is now demonstrated that incorporation of manganese in the expensive residuum catalyst also results in a more active and, more importantly an improved selectivity, catalyst.

Expensive selective residuum catalyst DZ-40 (Grace Davison) is impregnated with several concentrations of manganese; for example 68 grams of manganese acetate hydrate is dissolved in 100 ml of distilled water and brought to 90° C. (194° F.) to ensure solubility; 150 grams of virgin DZ-40 is dispersed in 100 ml of distilled water and also heated to boiling. These two ingredients are combined and stirred vigorously for 15 minutes and then allowed to cool to room temperature and settle. After settling for two hours, the slurry is stirred and dewatered by filtration. The filter cake is then allowed to air dry, then dried at 120° C. (248° F.) and finally calcined at 648.88° C. (1200° F.) for two hours.

Two additional samples of lower manganese content are also prepared in the same manner. The following table shows the resulting manganese content of these preparations and the resulting magnetic enhancement.

TABLE 13

|  | Mn (%) | Magnetic Susceptibility × 10–6 emu/gm |
|---|---|---|
| DZ-40 | 0.00 | 0.6 |
| DZ-40 | 0.24 | 1.2 |
| DZ-40 | 1.77 | 4.2 |
| DZ-40 | 1.98 | 5.0 |

It is apparent that magnetic enhancement is already existing at this level of manganese content.

Samples of these preparations are pretreated at routine severe deactivating conditions, and then submitted for activity, selectivity, and H2 and coke-make.

TABLE 14a

|  | 1 | 2 | 3 | 4 | 5 |
|---|---|---|---|---|---|
| Catalyst | DZ-40 | DZ-40 | DZ-40 | DZ-40 | DZ-40 |
| Mn Level | 0.0 | 0.24 | 1.77 | 1.77 | 1.98 |
| Recovered Wt. % | 97.0 | 97.4 | 98.0 | 97.9 | 97.5 |
| MAT Conversion |  |  |  |  |  |
| V (%) | 76.9 | 82.0 | 85.5 | 81.2 | 81.9 |
| Wt. % | 74.1 | 78.8 | 81.0 | 77.6 | 79.2 |
| AOI Rel. Act.* | 100 | 190 | 310 | 190 | 200 |
| Wt. % Gasoline | 45.6 | 48.6 | 52.5 | 53.4 | 48.9 |

*See FIG. 1, U.S. Pat. Nos. 4,406,773 and 4,407,714

TABLE 14b

|  |  | 1 | 2 | 3 | 4 | 5 |
|---|---|---|---|---|---|---|
| Activity $\frac{\text{Wt. \% Conv.}}{100 - \text{Wt. \% Conv.}}$ $\frac{X}{1-X}$ |  | 3.3 | 4.6 | 5.9 | 4.3 | 4.5 |
| Selectivity $\frac{\text{Wt. \% Gasoline}}{\text{Wt. \% Conv.}}$ |  | 0.61 | 0.62 | 0.65 | 0.69 | 0.69 |
| Wt. % H2/Activity |  | 0.054 | 0.032 | 0.019 | 0.018 | 0.038 |
| Coke/Activity |  | 2.30 | 1.70 | 1.21 | 1.59 | 1.89 |

EXAMPLE 7

(Separation of a High Cost Metal Resistant Catalyst Loaded With High Magnetic Susceptibility Enhancement Additive)

It is apparent from these results that magnetic enhancement with manganese, even at low levels, has the additional significant benefit of sharply increasing activity and selectivity, while at the same time sharply reducing undesirable coke make. Therefore, employing magnetic enhancement to selectively retain higher cost cracking catalyst, simultaneously results in the benefits of significantly enhanced catalyst activity and improved product slate, doubly improving catalytic cracker profit.

EXAMPLE 8

Another experiment is performed on a second commercial derived equilibrium FCC catalyst. This test is undertaken in a manner similar to Example 1, utilizing a mixture of 135 grams of this commercial equilibrium catalyst with 15 grams of ZSM5 again impregnated with 10% Mn. This mixture has the composition shown in Table 15.

TABLE 15

| | Composition | | | |
|---|---|---|---|---|
| | | PPM | | |
| Xg × 10–6 emu/gm | Ni | Fe | V | Mn |
| 5.71 | 400 | 4600 | 900 | 10,000 |

This mixture is processed through a high magnetic rare earth roller of the type described in U.S. Pat. No. 5,230,869 and 5,147,527 and separated into six cuts as shown in Table 16.

TABLE 16

| | Wt. | | | PPM | | |
|---|---|---|---|---|---|---|
| Cut | % | Xg × 10–6 emu/gm | Ni | Fe | V | Mn |
| 1 | 15.47 | 24.0 | 500 | 5900 | 500 | 62,000 |
| 2 | 12.91 | 3.5 | 600 | 4800 | 1100 | 4500 |
| 3 | 15.38 | 1.8 | 500 | 4600 | 1100 | 500 |
| 4 | 10.47 | 1.5 | 500 | 4500 | 1000 | 200 |
| 5 | 13.94 | 1.4 | 500 | 4400 | 1000 | 100 |
| 6 | 31.89 | 1.3 | 400 | 4100 | 900 | 0 |

Table 17 shows the distribution of manganese versus the various cuts.

TABLE 17

| Cut | Mn Yield ppm | % of Total Mn |
|---|---|---|
| 1 | 9591 | 96.0 |
| 2 | 580 | 5.8 |
| 3 | 77 | 0.8 |
| 4 | 21 | 0.2 |
| 5 | 14 | 0.1 |
| 6 | 0 | — |

This separation is made on a second, but nearly identical, rare earth roller magnetic separation unit as shown in U.S. Pat. Nos. 5,230,869 and 5,147,527 so as to further confirm these experimental benefits of magnetic enhancement separation. Table 17 again demonstrates that 96% of all of the additives is retained in the first 15.47 Wt.% recovery and essentially 100% in the first 28.5 wt.% cut of the feed.

This example also demonstrates that high metal content catalyst can also be removed for disposal after selective extraction of additive. If Cut 3, consisting of 15.4 wt.% of the mixture were removed by magnetic separation and disposed of, this would result in removal of a cut containing 500 ppm of Ni, 4600 ppm of Fe, and 1100 ppm of V, as compared with higher cuts including 31.89 wt.% of Cut 6, containing only 400 ppm of Ni, 4100 ppm of Fe, and 900 ppm of V.

This reduction in metals can be significant when utilizing this process on a unit operating on lower metal containing gas oil, and where cracking of n-paraffins and removal of sulfur is still of vital importance.

This example typifies how the process may also be used simultaneously to selectively first recover an expensive microspherical additive for recycle, then selectively and sequentially remove a high metal second cut of largely conventional lo metal-contaminated catalyst for disposal, with recycle of the remaining lower metal and more active remainder of the conventional catalyst.

EXAMPLE 9

This example demonstrates that a high cost residuum cracking catalyst, when combined with a magnetic enhancement additive, not only functions as a selective magnetic separation agent, but that the magnetic enhancement agent not only does not inhibit catalyst performance, but rather enhances performance. Virgin heavy resid catalyst with a low rare earth is impregnated with a solution of manganese acetate tetrahydrate in the following manner: 4.46 grams of manganese II acetate tetrahydrate is dissolved in 50 ml of $H_2O$ and heated to boiling to ensure solubility. This solution is rapidly mixed with a slurry of 100 grams of low-rare-earth-containing resid type catalyst in 150 ml of $H_2O$. This mixture is allowed to stand for 24 hours with periodic shaking, dewatered, filtered, and dried, then dried at 121.11° C. (250° F.) overnight and calcined at 648.88° C. (1200° F.) for four hours. Table 18 compares the catalyst before and after impregnation with manganese.

TABLE 18

| Composition of Low-Rare-Earth Containing Resid Type Catalyst | | |
|---|---|---|
| | Virgin w/o Mn | Virgin w/Mn |
| ID Number | CC 3360 | CC 3370 |
| Surface area M₂/gm | 257 | 232 |
| Matrix area M₂/gm | 132 | 144 |
| Pre Volume cc/gm | | |
| water | 0.41 | 0.41 |
| mercury | 0.37 | 0.36 |
| Density g/cc | | |
| Bulk | 0.68 | 0.70 |
| Skeletal | 2.59 | 2.64 |
| Zeolite Intensity | 14.2 | 13.9 |
| Unit cell size, Angstroms | 24.57 | 24.58 |
| Chemical Composition (wt. %) | | |
| $Al_2O_3$ | 45.9 | 44.9 |
| $SiO_2$ | 52.1 | 51.4 |
| $Nd_2O_3$ | 0.01 | 0.01 |
| $Pr_6O_{11}$ | 0.02 | 0.02 |
| $La_2O_3$ | 0.09 | 0.07 |
| $CeO_2$ | 0.03 | 0.03 |
| $TiO_2$ | 1.39 | 1.39 |
| Iron | 3700 | 3800 |
| Sodium | 2300 | 2500 |
| Manganese | <100 | 6900 |

The finished catalyst was analyzed by Ashland Oil, Inc, labs and found to contain 6900 ppm of manganese. Catalytic comparison was then made of the catalyst with and without manganese and impregnated with 3000 ppm of Ni plus V and then steam deactivated at 760° C. (1400° F.) for five hours in 3% air.

These two catalysts were then subjected to a modified ASTM D3907 procedure microactivity test (MAT). The results as shown in Table 19 are obtained when the two catalysts are compared at the same wt. % conversion.

TABLE 19

| Catalyst | AKC No. 1 | AKC No. 1 + Mn |
|---|---|---|
| Cat/Oil | 4.0 | 3.1 |
| Temperature °F. | 915 | 915 |
| Metals Ni and V | 3000 ppm | 3000 ppm |
| Wt. % Yields | AKC No. 1 | AKC No. 1 + Mn |
| Conversion | 70.4 | 70.7 |
| iC4 | 3.77 | 4.25 |
| C5 - 430° F. | 50.27 | 51.15 |
| Coke | 4.41 | 4.62 |
| H2 | 0.43 | 0.38 |
| Selectivity $\frac{\text{Wt. \% Gasoline}}{\text{Wt. \% Conversion}}$ | 0.714 | 0.723 |
| Activity $\frac{\text{Wt. \% Conv.}}{100 - \text{Wt. \% Conv.}}$ | 2.38 | 2.41 |
| Coke/Act | 1.9 | 1.9 |
| H2/Act | 0.18 | 0.16 |

These results show that with manganese, the catalyst loaded with metals possessed greater activity, yielding the same conversion with a cat/oil ratio of 3.1 versus the non-manganese catalyst requiring a cat/oil ratio of 4 or more to obtain the same conversion. The manganese catalyst therefore enhanced activity rather than lowering activity in the presence of metals, while at the same time increasing isobutane (critical for alkylation feed) from 3.77 wt. % to 4.25 wt. %, while also enhancing gasoline yield appreciably from 50.27 wt. % to 51.15 wt. % (selectivity increased from 0.714 to 0.723) and lowering undesirable hydrogen make from 0.43 wt. % to 0.38 wt. %.

These results clearly show that an expensive resid type catalyst when bearing magnetic enhancement agent even in the presence of large amounts of catalyst poisons, still performs as well, and even better than a non-promoted catalyst, showing that the additive also protects the catalyst from deactivation in the presence of nickel and vanadium, an additional advantage of magnetic enhancement treatment.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. For example, the additive particles can comprise a sulfur transfer agent such as DeSOX.

Reference to documents made in the specification is intended to result in such patents or literature being expressly incorporated herein by reference including any patents or other literature references cited within such documents.

What is claimed is:

1. In a catalytic cracking process comprising circulating conventional catalyst particles mixed with additive particles, the improvement comprising:
   a) before adding additive particles to said process, incorporating within said additive particles a magnetic moiety;
   b) withdrawing a portion of said mixed particles from said circulating catalyst particles;
   c) magnetically separating out from said portion a cut comprising additive particles.

2. A process of claim 1 additionally comprising recycling said additive particles to a catalytic cracking process.

3. A process of claim 1 additionally comprising separating a second cut comprising metal-contaminated catalyst by magnetic separation.

4. In a catalytic process comprising circulating catalyst particles mixed with additive particles, the improvement comprising:
   a) incorporating within said additive particles a magnetic moiety;
   b) withdrawing a portion of said mixed particles from said circulating catalyst particles;
   c) magnetically separating out a first cut comprising metal-contaminated conventional catalyst particles; and
   d) magnetically separating out from the remainder of said portion a second cut comprising additive particles.

5. A process of claim 1 in which said additive particles comprise about 0.05 to 20 wt. % of manganese.

6. A process of claim 1 in which said additive particles comprise about 0.1 to 10 wt. % manganese.

7. A process of claim 1 in which said additive particles comprise about 0.1 to 10 wt. % heavy rare earth.

8. A process of claim 1 in which said additive particles comprise a superparamagnetic magnetic moiety containing 0.01 to 1.0 wt. % magnetite equivalent.

9. A process of claim 1 in which said additives particles comprise about 0.1 to 10 wt. % iron.

10. A process of claim 1 in which said magnetic separation employs a magnetic separator comprising a permanent rare earth magnet roller.

11. A process of claim 1 in which the magnetic separator comprises an electromagnet.

12. A process of claim 1 in which the magnetic separator comprises a ferrite permanent magnet roller.

13. A process of claim 1 wherein said additive particles are separated by means comprising a "magnetic hook" process.

14. A catalyst cracking process of claim 1 in which the additive particles comprise ZSM5.

15. A catalytic cracking process of claim 1 in which the additive particles comprise an acidic, non-zeolite containing, bottoms cracking additive.

16. A process as claimed in claim 1, wherein the magnetic moiety comprises manganese or heavy rare earths and wherein the magnetic moiety is removed from deactivated additive particles by chemical reaction, and recycled for incorporating into new additive particles.

17. A particle comprising
   a) a specialty additive for catalytic cracking of hydrocarbons, and
   b) about 0.1 to 10 wt. % of a magnetic moiety for facilitating separation by magnetic means.

18. A particle of claim 17 in which the magnetic moiety comprises manganese in concentration of about 0.05 to 20 wt. %.

19. A particle of claim 17 in which the magnetic moiety comprises one or more of the heavy rare earths in concentrations of about 0.1 to 10 wt. %.

20. A particle of claim 17 in which the magnetic moiety comprises manganese in concentration of about 0.1 to 10 wt. %.

21. A particle of claim 17 in which the magnetic moiety comprises superparamagnetic iron in concentration sufficient to produce particles with a magnetic susceptibility of at least $6 \times 10^{-6}$ emu/gm.

22. A particle of claim 17 in which the magnetic moiety comprises about 0.1 to 10 wt. % iron.

23. A particle of claim 17 in which the additive particles comprise a sulfur-controlling additive.

24. A particle of claim 17 in which the additive particles comprise a platinum- or palladium-containing burning promoter additive.

25. A particle of claim 17 in which the additive particles comprise a vanadia trapping or immobilizer additive.

26. A particle of claim 17 comprising a magnetic moiety comprising an acetate, carbonate, chloride, phosphate, nitrate, oxalate, sulfate, or acetyl acetonate.

27. A particle of claim 17 comprising manganese acetate, carbonate, chloride, phosphate, nitrate, oxalate, sulfate, acetyl acetonate, or monocyclopentadienyl manganese tricarbonyl (MMT).

* * * * *